US009588558B2

(12) United States Patent  (10) Patent No.: US 9,588,558 B2
McKnight et al.  (45) Date of Patent: Mar. 7, 2017

(54) ON-CHIP INTEGRATED PROCESSING AND POWER GENERATION

(71) Applicant: Microsoft Corporation, Redmond, WA (US)

(72) Inventors: Gregory Joseph McKnight, Bellevue, WA (US); Christian L. Belady, Mercer Island, WA (US); Brandon Aaron Rubenstein, Lynnwood, WA (US); Brian Janous, Issaquah, WA (US); Sean M. James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 584 days.

(21) Appl. No.: 13/917,625

(22) Filed: Jun. 13, 2013

(65) Prior Publication Data

US 2014/0372772 A1  Dec. 18, 2014

(51) Int. Cl.
*G06F 1/26* (2006.01)
*G06F 1/32* (2006.01)
(Continued)

(52) U.S. Cl.
CPC .............. *G06F 1/26* (2013.01); *G06F 9/4893* (2013.01); *H01M 8/04007* (2013.01);
(Continued)

(58) Field of Classification Search
CPC ......... G06F 1/26; G06F 9/3885; G06F 9/4893
(Continued)

(56) References Cited

U.S. PATENT DOCUMENTS 6,991,866 B2  1/2006  Marsh
7,141,325 B2  11/2006  Desbiens
(Continued)

FOREIGN PATENT DOCUMENTS

JP  2002151873 A  5/2002
JP  2006024418 A  1/2006

OTHER PUBLICATIONS

"Second Written Opinion Issued in PCT Application No. PCT/US2014/040114", Mailed Date: Jun. 22, 2015, 4 Pages.
(Continued)

*Primary Examiner* — Michael J Brown
(74) *Attorney, Agent, or Firm* — Henry Gabryjelski; Kate Drakos; Micky Minhas

(57) ABSTRACT

A self-powered processing device comprises both a processing device and a power generator that are physically, electrically, and thermally coupled to one another. The power generator can be a fuel cell that can be manufactured from materials that can also support processing circuitry, such as silicon-based materials. A thermal coupling between the power generator and the processing device can include a thermoelectric either generating electrical power from the temperature differential or consuming electrical power to generate a temperature differential. A computing device with self-powered processing devices also includes energy storage devices to store excess energy produced by the self-powered processing device and provide it back during times of need. The self-powered processing device comprises either a wireless or wired network connection, the latter being connectable to a slot on a backplane that can aggregate multiple self-powered processing devices and provide fuel delivery paths for them.

20 Claims, 6 Drawing Sheets

(51) Int. Cl.
  *G06F 9/48* (2006.01)
  *H01M 16/00* (2006.01)
  *H01M 8/04* (2016.01)
  *G06F 9/38* (2006.01)
  *H01M 8/10* (2016.01)
  *H01M 8/12* (2016.01)
  *H01M 8/24* (2016.01)

(52) U.S. Cl.
  CPC ......... *H01M 16/006* (2013.01); *G06F 9/3885* (2013.01); *H01M 8/1097* (2013.01); *H01M 8/1286* (2013.01); *H01M 8/241* (2013.01); *H01M 2008/1095* (2013.01); *H01M 2008/1293* (2013.01); *H01M 2250/10* (2013.01); *H01M 2250/30* (2013.01); *Y02B 90/14* (2013.01); *Y02B 90/18* (2013.01); *Y02E 60/50* (2013.01); *Y02E 60/525* (2013.01); *Y02P 70/56* (2015.11)

(58) Field of Classification Search
  USPC ........................................ 713/300, 310, 340
  See application file for complete search history.

(56) References Cited

U.S. PATENT DOCUMENTS

| | | | |
|---|---|---|---|
| 7,892,693 | B2 | 2/2011 | Siciliano et al. |
| 2004/0219405 | A1 | 11/2004 | Lyon et al. |
| 2006/0192523 | A1 | 8/2006 | Nomoto |
| 2007/0039641 | A1 | 2/2007 | Hu et al. |
| 2007/0224461 | A1 | 9/2007 | Oh |
| 2009/0286108 | A1 | 11/2009 | Kim et al. |
| 2013/0063698 | A1 | 3/2013 | Akiba et al. |
| 2013/0078544 | A1* | 3/2013 | Braithwaite ...... H01M 8/04014 429/442 |

OTHER PUBLICATIONS

"International Search Report and Written Opinion Issued in PCT Patent Application No. PCT/US2014/040114", Mailed Date: Jan. 22, 2015, 13 Pages.

Slavcheva, et al., "Chip Integrated Hydrogen Generation-Storage-Power Micro System (HyGenMEMS)", Retrieved at <<http://www.iwe1.rwth-aachen.de/deutsch/4-forschung/2-projekte/hygenmems.pdf>>, Retrieved Date: Apr. 12, 2013, pp. 2.

"Powering an Energy Revolution: Fuel Cells Promise Improvements in Transportation, Electronics and Power Generation", Retrieved at <<http://www.gtri.gatech.edu/casestudy/powering-energy-revolution>>, Jun. 12, 2002, pp. 7.

Erdler, et al., "Chip Integrated Fuel Cell", Retrieved at <<https://www2.lirmm.fr/lirmm/interne/BIBLI/CDROM/MIC/2005/EuroTrans_2005/EUROSENSORS_2005/pdfs/MC2.pdf>>, In Journal of Sensors and Actuators A—Physical, vol. 132, Issue 1, Nov. 8, 2006, pp. 4.

Lopez-Montesinos, et al., "Design, Fabrication, and Characterization of a Planar, Silicon-based, Monolithically Integrated Micro Laminar Flow Fuel Cell with a Bridge-Shaped Microchannel Cross-Section", Retrieved at <<http://www.scs.illinois.edu/kenis/Files/85_JPowSour_Mono_LFFC_Bridge_Microchannel_2011.pdf>>, In Journal of Power Sources, vol. 196, Jan. 21, 2011, pp. 8.

Kajita, et al., "Development of Light-Driven H2/O2 Generation Chip for Micro Fuel Cell Devices", Retrieved at <<http://www.rsc.org/images/loc/2012/pdf/W.9.199.pdf>>, In 16th International Conference on Miniaturized Systems for Chemistry and Life Sciences, Oct. 28, 2012, pp. 3.

* cited by examiner

ON-CHIP INTEGRATED PROCESSING AND POWER GENERATION

BACKGROUND

As the throughput of network communications among multiple computing devices continues to increase, it becomes more practical to perform computational processing outside of the context of physically fixed traditional computing devices, such as the ubiquitous desktop computing device or the equally ubiquitous server computing device. For example, processing tasks that can be divided into sub-tasks, which can then be performed in parallel, can be efficiently completed by a multitude of physically distributed processing units, including processing units that are not considered to be computationally powerful, such as low-power consumption processing units. Such physically distributed processing units need not reside within a single data center, or other like physical boundary, but can, instead, be physically distributed across a myriad of different physical devices in different physical locations. So long as such devices can efficiently communicate with one another, their physical location can be immaterial.

While high throughput network communications can enable computing devices to take a myriad of forms, electrical power is still required by the processing circuitry. Consequently, computing devices require, either a tethered connection to an electrical power source, such as a traditional wall outlet, or an untethered electrical power source, such as a battery. As will be recognized by those skilled in the art, the use of batteries to power computational processing can comprise disadvantages including, for example, the limited capacity of batteries to store electrical energy, the limited charge and discharge cycle lifetime of batteries, the cost of manufacturing batteries, including the processing of hazardous chemicals, and other like disadvantages. As will also be recognized by those skilled in the art, electrical power obtained from an electrical power grid can also comprise disadvantages, including high cost, unreliability under certain circumstances, and the requirement for substantial infrastructure and support thereof.

SUMMARY

In one embodiment, a processing device, such as an integrated circuit comprising one or more central processing units (CPUs) or a system-on-a-chip (SOC) can be coupled with a power generator of an analogous physical size that can provide electrical power to the processing device, thereby creating a standalone self-powered processing device that can consume raw materials, such as the materials required by the power generator, and output processed data. The processing device and power generator can be physically, electrically, and thermally coupled to one another to form a single unitary self-powered processing device.

In another embodiment, the power generator can be a fuel cell that can be manufactured from materials that can also support processing circuitry, such as silicon-based materials. Such a fuel cell can be physically sized so as to have a surface area commensurate with the surface area of the processing device to which it is coupled. Fuel, such as in the form of hydrogen or methane gas and an oxidant gas can be directed over the anode and cathode, respectively, of such a fuel cell, either in an orthogonal orientation, such the direction of flow separates the two fuels, or in a parallel orientation, such that a baffle or other physical barrier separates the two fuels. The devices can be vertically stacked so as to enable portions of one device in the stack to create a plenum to deliver fuel, in the form of a gas, to portions of another device in the stack.

In yet another embodiment, the processing device can comprise a physical communicational connection, such as leads protruding from, or to the edge of, such a device, thereby enabling multiple ones of such unitary power generator and processing devices to be communicationally coupled, such as to a backplane having physical receptors for the physical communicational connections. Such a backplane can also provide high-bandwidth communication connections to broader networks of computing devices, as well as other functionality. Alternatively, or in addition, the processing device can comprise a wireless communication connection, such as a high-frequency wireless communication connection that can provide for high throughput wireless communications across short distances, even in noisy environments.

In a further embodiment, the thermal coupling between the power generator and the processing device can comprise a thermoelectric that can generate electrical power from the temperature differential between the processing device, which can be operated at a lower temperature, and the power generator, which, in the case of fuel cell, can maintain a higher temperature. Alternatively, the thermal electric can consume electrical power and generate a temperature differential between the power generator in the processing device, thereby beneficially cooling the processing device while beneficially adding heat to the power generator. The thermal coupling between the power generator and the processing device can further comprise a thermal coupling between the fuel being delivered to the power generator and the processing device, thereby enabling the cool fuel to cool the processing device prior to being consumed by the power generator.

In a still further embodiment, a computing device can comprise one or more self-powered processing devices together with one or more energy storage devices such that the energy produced by the self-powered processing device can be stored in the energy storage device during periods when a minimal amount of processing is being performed and, consequently, the self-powered processing device may be producing more electrical power than its processing is consumed. Conversely, during periods of increased processing, the self-powered processing device may need to consume a greater amount of electrical power then it can produce and, consequently, can consume some of the energy stored in the energy storage device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
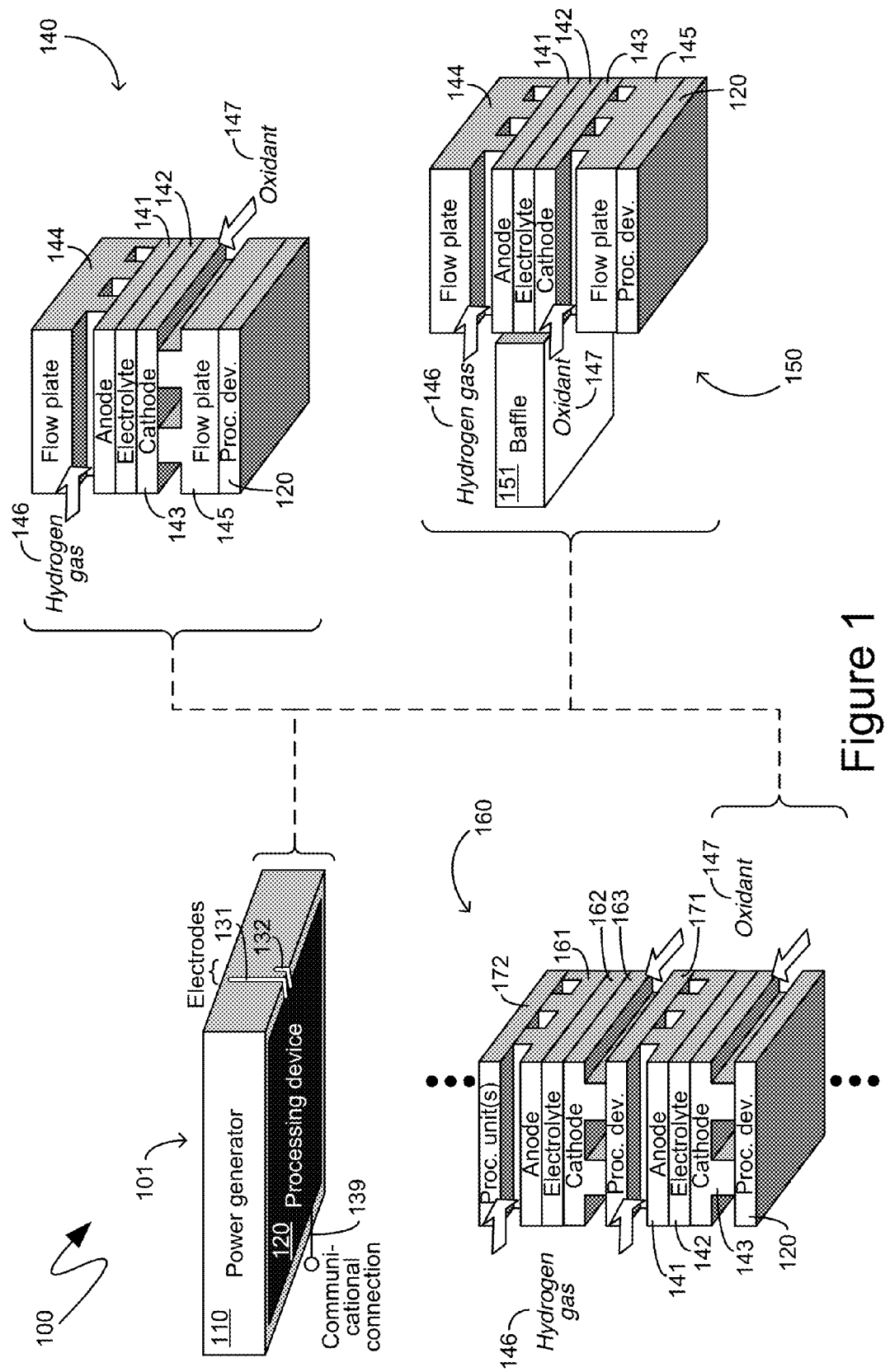
FIG. 1 is a block diagram of an exemplary unitary self-powered processing device.

The following description relates to a single unitary self-powered processing device comprising both a processing device, such as a "chip" comprising one or more central processing units (CPUs) or a system-on-a-chip (SOC), and a power generator of an analogous physical size that can provide electrical power to the processing device. The processing device and power generator can be physically, electrically, and thermally coupled to one another to form the self-powered processing device. The power generator can be a fuel cell that can be manufactured from materials that can also support processing circuitry, such as silicon-based materials. The thermal coupling between the power generator and the processing device can comprise a thermoelectric that can generate electrical power from the temperature differential between the processing device, which can be operated at a lower temperature, and the power generator, which, in the case of a fuel cell, can maintain a higher temperature. Alternatively, the thermal electric can consume electrical power and generate a temperature differential between the power generator in the processing device, thereby beneficially cooling the processing device while beneficially adding heat to the power generator. A computing device can comprise one or more self-powered processing devices together with one or more energy storage devices such that the energy produced by the self-powered processing device can be stored in the energy storage device during periods when a minimal amount of processing is being performed and, consequently, the self-powered processing device may be producing more electrical power than its processing is consuming. Conversely, during periods of increased processing, the self-powered processing device may need to consume a greater amount of electrical power then it can produce and, consequently, can consume some of the energy stored in the energy storage device.

For purposes of illustration, the techniques described herein make reference to existing and known data processing circuitry such as the silicon-based circuitry commonly found in modern computing devices, including desktop, laptop and server computing devices, as well as network communication computing devices, such as routers and switches, and data storage computing devices such as magnetic and solid-state hard disk drives. Such references, however, are strictly exemplary and are not intended to limit the mechanisms described to the specific examples provided. Indeed, the techniques described are applicable to any mechanisms and equipment that can process data, irrespective of the manner in which such mechanisms and equipment operate and irrespective of the type of power required by such mechanisms and such equipment performing such data processing.

Additionally, the techniques described herein make reference to specific types of power generators. For example, reference is made to fuel cells, such as a proton exchange membrane (PEM) fuel cell. Such references, however, are strictly exemplary and are made for ease of description and presentation, and are not intended to limit the mechanisms described to specific devices. Instead, the techniques described herein are equally applicable, with or without modification, to any device or mechanism generating electrical power from raw materials, such as Silicon Oxide Fuel Cells, Phosphoric Acid Fuel Cells, and Molten Carbonate Fuel Cells, including, but not limited to hydrocarbon based raw materials.

Although not required, the descriptions below reference computer-executable instructions, such as program modules, being executed by a computing device. More specifically, the descriptions reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data. Generally, program modules include routines, programs, objects, components, data structures, and the like that perform particular tasks or implement particular abstract data types.

Turning to FIG. 1, an exemplary system 100, providing context for the descriptions below, is shown. The exemplary system 100 comprises a self-powered processing device 101, as well as variations thereof in the form of self-powered processing devices 140, 150 and 160 that can comprise alternative embodiments of the power generator 110 of the self-powered processing device 101. Turning first to the self-powered processing device 101, the self-powered processing device 101 can comprise a power generator 110 and a processing device 120. In one embodiment, the power generator 110 can generate electrical power to be utilized by the processing device 120, thereby enabling the self-powered processing device 101 to perform useful computations without obtaining power from external sources. The electrical power generated by the power generator 110 can be of a type that can be directly consumed by the processing circuitry of the processing device 120 and can be of a native voltage of such processing circuitry, thereby enabling the processing device 120 to consume such electrical power without the need for power transformers or power converters. For example, the power generator 110 can provide direct current electrical power to the processing device 120. Such direct current electrical power can be provided, as one example, with a potential of between 0.7 volts and 1.2 volts, such as would be needed if were consumed by low-voltage processing devices. As another example, the direct current electrical power provided by the power generator 110 can be provided at a higher voltage than 1.2 volts to accommodate increased processing by, for example, networking, storage or other system-on-a-chip (SOC) processing devices. As yet another example, the direct current electrical power provided by the power generator 110 can be provided at a lower voltage than 0.7 volts to accommodate ultra-low power processing devices, including SOC processing devices.

Electrical power from the power generator 110 can be provided to the processing device 120 via electrical connections, such as the electrodes 131 and 132. More specifically, the processing device 120 can comprise one or more integrated circuits that can include input lines for receiving electrical power. Such input lines can be communicationally coupled to pins or other like connectors at the periphery of the processing device 120. The electrodes 131 and 132 can then connect to such pins or other connectors to provide electrical power from the power generator 110 to the processing device 120.

In addition to the electrodes 131 and 132, the processing device 120 can also comprise a communicational connection 139, which can, in one embodiment, similarly include electrically conducting lines that can extend to the periphery of the processing device 120. For example, the communicational connection 139 can comprise a series of lines that can be analogous to, or equivalent to, the wiring in a standard Ethernet communicational coupling. Such lines can extend from communicational circuitry of the processing device 120 to the periphery of the processing device 120 or they can be communicationally coupled to external communicational architecture such as, for example, a plug or other like physical interface for establishing a communicational connection with the processing device 120 through the communication connection 139.

In one embodiment, the power generator 110 can be in the form of a fuel cell, at least some of whose components can comprise a source material equivalent to that utilized to support the processing device 120. For example, the power generator 110 can be a fuel cell that can comprise silicon-based materials such that the processing device 120 can be built utilizing similar silicon-based materials and or manufacturing techniques. In such an embodiment, the processing device 120 can be etched onto an opposite side of one or more components of the power generator 110. In other embodiments, the power generator 110 and the processing device 120 can be manufactured independently and then joined, such as through mechanisms that can render their combination to be a single, unitary device having common physical, electrical and thermal attributes.

One type of fuel cell that the power generator 110 can comprise can be a proton exchange membrane (PEM) fuel cell. As will be recognized by those skilled in the art, PEM fuel cells can operate at lower temperatures and pressures than other fuel cells. A PEM fuel cell can utilize hydrogen, or a hydrocarbon from which hydrogen can be derived, as well as oxygen, or another oxidant, as fuel. More specifically, the electrolyte of a PEM fuel cell can be a thin polymer membrane that can be permeable to protons, but which does not conduct electrons, while the anode and the cathode can be made from carbon, or other like materials, including silicon-based materials. Hydrogen fuel can be provided to the anode, where it can be split into hydrogen ions, or protons, and electrons. The hydrogen ions can permeate across the electrolyte to the cathode, while the electrons can flow through an external circuit and, thereby, provide power to such an external circuit. Oxygen, such as from the air, or another oxidant, can be supplied to the cathode, where oxygen can combine with the electrons and the hydrogen ions to produce water.

Another type of fuel cell that that the power generator 110 can comprise can be a gas solid oxide fuel cell that can comprise an electrolyte, typically in the form of a solid ceramic material, and an anode and cathode on opposite sides of the electrolyte, each typically comprised of an ink coating on the electrolyte. Such a fuel cell can accept natural gas as input and, inside of the fuel cell, the natural gas can be mixed with water steam to form a "reformed fuel". This reformed fuel enters the anode side of the electrolyte and as it crosses the anode it attracts oxygen ions from the cathode, which are attracted into the cathode from the hot air that is fed to the fuel cell. The oxygen ions combine with the reformed fuel in the electrolyte to produce electricity, water, and small amounts of carbon dioxide, as well as heat. The heat and water can then be utilized to continue the process, thereby enabling the fuel cell to continue to produce direct-current electricity so long as natural gas remains available to it. Other types of fuel cells can also be utilized.

Turning back to FIG. 1, one example of the power generator 110 can be a fuel cell whose components can be oriented in the manner illustrated by the exemplary self-powered processing device 140. As illustrated in FIG. 1, the exemplary self-powered processing device 140 can comprise the processing device 120 and a fuel cell comprising the above-mentioned anode, such as in the form of the anode 141, the above-mentioned cathode, such as in the form of the cathode 143, and the above-mentioned electrolyte, such as in the form of the electrolyte 142. If the fuel cell of the exemplary self-powered processing device 140 is a PEM fuel cell, then a fuel, such as the hydrogen gas 146 can be provided to the anode 141 and an oxidant, such as the oxidant 147 can be provided to the cathode. In one embodiment, flow plates can be utilized to direct the hydrogen gas 146 to the anode 141 and the oxidant 147 to the cathode 143 to increase the efficiency with which such fuel is consumed by the anode 141 and the cathode 143, respectively. For example, the flow plate 144 can comprise openings, or guides, such as in the manner shown in FIG. 1, which can force the hydrogen gas 146 towards the anode 141, thereby increasing consumption of the hydrogen gas 146 by the anode 141. Similarly, the flow plate 145 can also comprise openings, or guides, such as in the manner shown in FIG. 1, which can force the oxidant 147 towards the cathode 143, thereby increasing its utilization by the cathode 143. As will be recognized by those skilled in the art, the components of the exemplary self-powered processing device 140 that are shown in FIG. 1 are not drawn to scale, but, instead, are shown in a manner in which the vertical dimension is exaggerated in order to illustrate the operation and design of the flow plates 144 and 145.

In one embodiment, in order to keep the hydrogen gas 146 separate from the oxidant 147, the hydrogen gas 146 can be provided to the fuel cell of the exemplary self-powered processing device 140 from a direction orthogonal to the direction from which the oxidant 147 is provided. For example, as illustrated in FIG. 1, the hydrogen gas 146 can be provided from a left side of the exemplary self-powered processing device 140, proceeding across the anode 141 from left to right, as dictated by the channels, or guides, of the flow plate 144. Conversely, the oxidant 147 can be provided from what is graphically illustrated as the back of the exemplary self-powered processing device 140, and can proceed across the cathode 143 in a back-to-front direction that is orthogonal to the left-to-right direction of the hydrogen gas 146.

In an alternative embodiment, the hydrogen gas 146 can be kept separate from the oxidant 147 by a physical barrier, such as the baffle 151 shown as part of the exemplary self-powered processing device 150 that is illustrated in FIG. 1. In such an alternative embodiment, the hydrogen gas 146 and the oxidant 147 can be provided from the same direction. Thus, as illustrated in FIG. 1 by the exemplary self-powered processing device 150, the hydrogen gas 146 and the oxidant 147 can both be provided from the left of the self-powered processing device 150 and can pass across the anode 141 and cathode 143, respectively, in a left-to-right manner, as guided by the flow plates 144 and 145, respectively. In such an embodiment, the flow plates 144 and 145 can have their channels aligned in the same direction, as opposed to being oriented in orthogonal directions as was illustrated by the exemplary self-powered processing device 140.

In a further alternative embodiment, rather than utilizing explicit flow plate structures, such as the flow plates 144 and 145 illustrated in the exemplary self-powered processing devices 140 and 150 of FIG. 1, a stacked arrangement can be utilized, such as is illustrated by the exemplary stacked self-powered processing devices 160. In such a stacked arrangement, structures of one self-powered processing device can act as flow plates for an adjoining self-powered processing device. For example, as illustrated by the exemplary stacked self-powered processing devices 160, one self-powered processing device can comprise the processing device 120 and a fuel cell comprising the anode 141, the electrolyte 142 and the cathode 143. Another, different, self-powered processing device can comprise the processing device 171 and a fuel cell comprising the anode 161, the electrolyte 162 and the cathode 163. As illustrated in FIG. 1, the processing device 171 can act as a flow plate for the anode 141 of the self-powered processing device stacked below it. More particularly, in such an embodiment, the anode and cathode of the fuel cells associated with such stacked self-powered processing devices can be manufactured in such a way that they themselves comprise guides, or channels, which, when framed by other self-powered processing devices that are stacked proximate thereto, can form structures that can force the relevant fuel gas across the relevant electrode. Thus, the anode 141 can be manufactured to comprise guides or channels that, in combination with the processing device 171 stacked thereupon, can force the hydrogen gas 146 across the surface of the anode 141.

A similar structure can be created by the cathode 143 and the processing device 120, which can be positioned immediately underneath and attached to the cathode 143 such that the channels of the cathode 143, in communion with the processing device 120, can cause the oxidant 147 across the cathode 143. As illustrated by the exemplary stacked self-powered processing devices 160, such an arrangement can be repeated, thereby enabling all of the stacked self-powered processing devices, with the possible exception of the topmost and/or bottommost ones, to avoid the need for flow plates. The processing device 172, shown in FIG. 1, illustrates such a repetition, since the processing device 172 can be part of a self-powered processing device that is stacked on top of the self-powered processing device comprising the processing device 171 and a fuel cell comprising the anode 161, the electrolyte 162 and the cathode 163.

Figure 2:
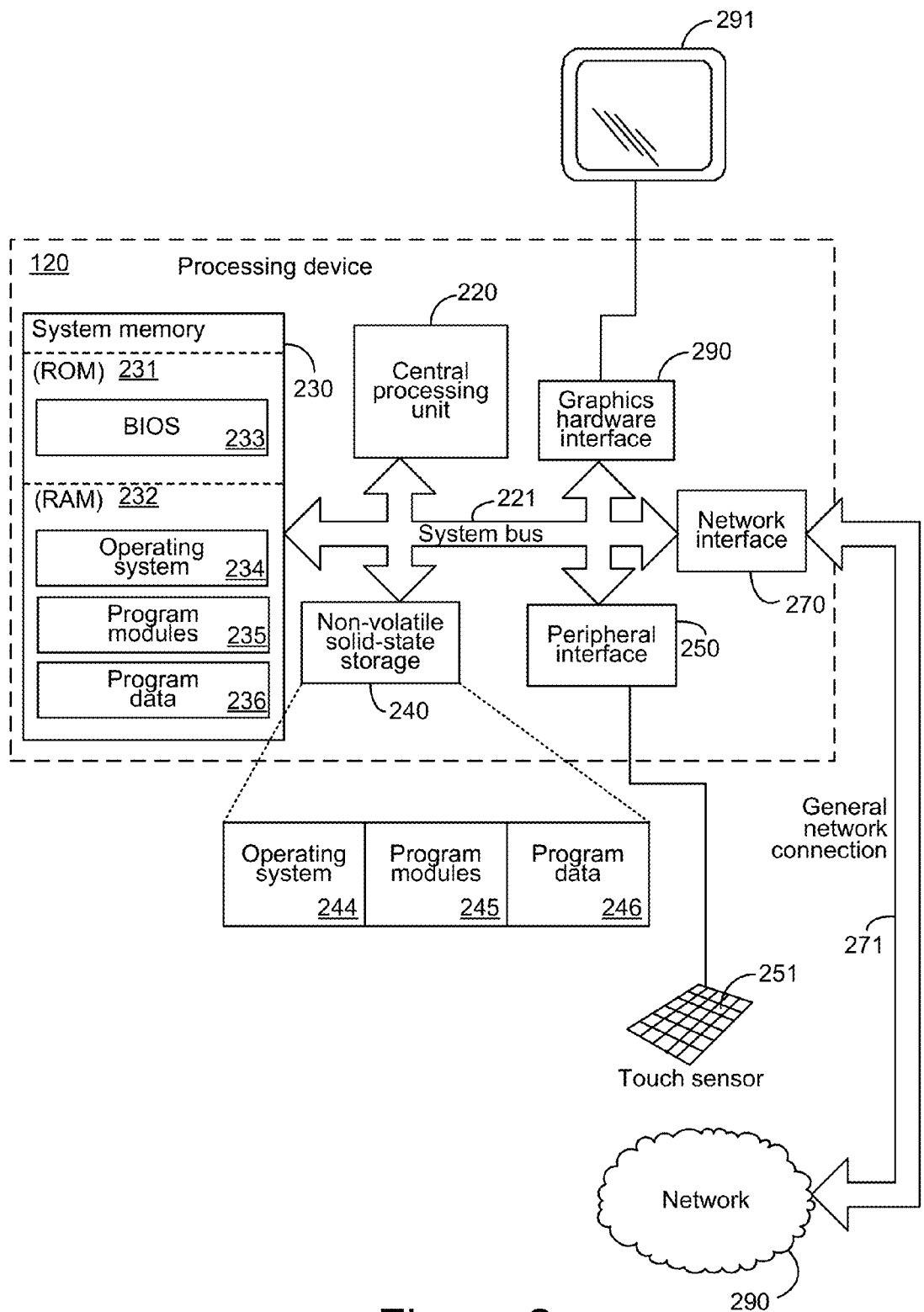
FIG. 2 is a block diagram of exemplary processing device.

Turning to FIG. 2, the processing device 120, illustrated in FIG. 1, can be, in one embodiment, more than merely a single-function processing device, and can, instead, comprise multiple independent processing devices, and other transistor-based structures that can all be etched from, for example, a single piece of silicon-based material. For example, in one embodiment, the processing device 120 of FIG. 1 can be a System On a Chip (SOC), or other like device, that can include a variety of processing capabilities, as well as other data-centric capabilities, such as data storage capabilities. For example, and with reference to FIG. 2, the exemplary processing device 120 shown therein can include one or more central processing units (CPUs) 220, a system memory 230, that can include RAM 232, and a system bus 221 that couples various system components including the system memory to the processing unit 220. All such components can, in one embodiment, be structures etched on a single piece of silicon-based material. The processing device 120 can optionally include graphics hardware, such as for the display of visual user interfaces, including, but not limited to, a graphics hardware interface 290 that can enable the processing device 120 to be communicationally coupled with an external display device 291. Additionally, the processing device 120 can also include a peripheral interface 250 that can enable the processing device 120 to be communicationally coupled with one or more external peripherals, including external user input peripherals, such as, for example, the touch sensor 251 illustrated in FIG. 2.

The processing device 120 can further include, as other structures etched on a single piece of silicon-based material, computer readable media, which can include any available media that can be accessed by processing device 120. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, as well as solid state storage media or any other medium which can be used to store the desired information and can be compatible with the construction of the processing device 120. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and the aforementioned RAM 232. A basic input/output system 233 (BIOS), containing the basic routines that help to transfer information between elements within processing device 120, such as during start-up, is typically stored in ROM 231. RAM 232 typically contains data and/or program modules that are immediately accessible to and/or presently being operated on by processing unit 220. By way of example, and not limitation, FIG. 2 illustrates the operating system 234 along with other program modules 235, and program data 236. The processing device 120 may also include other computer storage media, such as the non-volatile solid-state storage 240 shown in FIG. 2. The non-volatile solid-state storage 240 can be connected to the system bus 221.

The computer storage media referenced above, such as the non-volatile solid-state storage 240 illustrated in FIG. 2, provide storage of computer readable instructions, data structures, program modules and other data for the processing device 120. In FIG. 2, for example, the non-volatile solid-state storage 240 is illustrated as storing operating system 244, other program modules 245, and program data 246. Note that these components can either be the same as or different from operating system 234, other program modules 235 and program data 236. Operating system 244, other program modules 245 and program data 246 are given different numbers hereto illustrate that, at a minimum, they are different copies.

The processing device 120 can operate in a networked environment, represented by the network 290, using logical connections to one or more remote computers. The processing device 120 is illustrated as being connected to the general network connection 271 through a network interface or adapter 270, which is, in turn, connected to the system bus 221. As will be described in further detail below, the network interface 270 can comprise a physical network interface, such as through a physical coupling between electrical leads extending to the periphery of the processing device 120 and an appropriate slot or other like connector on another physical device. Alternatively, as will also be described in further detail below, the network interface 270 can comprise a wireless network interface that can establish a general network connection 271 in the form of a wireless network connection. In a networked environment, program modules depicted relative to the processing device 120, or portions or peripherals thereof, may be stored in the memory of one or more other computing devices that are communicatively coupled to the processing device 120 through the general network connection 271. It will be appreciated that the network connections shown are exemplary and other means of establishing a communications link between computing devices may be used.

Figure 3:
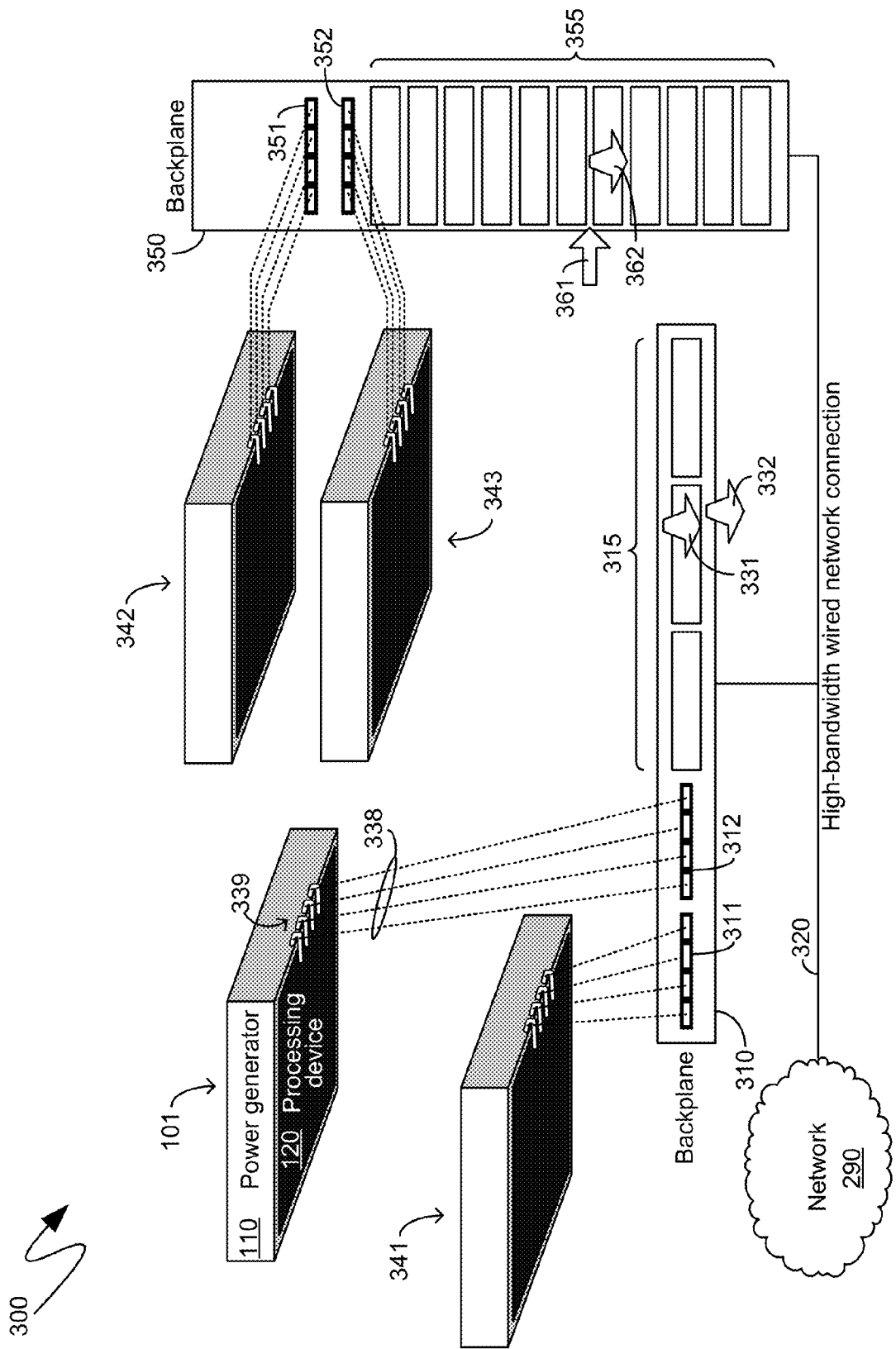
FIG. 3 is a block diagram of an exemplary arrangement of unitary self-powered processing devices.

Before proceeding with FIG. 3, as can be seen from the above descriptions of FIGS. 1 and 2, integration of core components, energy generation, computation, storage and networking can eliminate much tangential technology, such as spinning magnetic disk drives, discrete integrated circuits (ICs), board traces, connectors, power supplies, and other like tangential technology. As will be recognized by those skilled in the art, such tangential technology is a source of failures and manufacturing costs. Consequently, the above-described integration can decrease the potential for failures, decrease manufacturing and lifecycle costs as well as increase aggregate system performance. As such, the integration of such components enables them to be more than the sum of their individual, constituent parts. For example, by integrating power generation the discrete and moving parts of the power supply can be reduced or eliminated entirely. Similarly, network switches and spinning disks drives can, likewise, be reduced or eliminated. Such efficiencies can enable repackaging of the standard compute, storage, and network "rack" structure into self-powered units that can achieve greater performance, lower operating costs and improved reliability. And while silicon processes used for fuel cells can differ from the processes used to develop solid state processing and storage devices, these dissimilar silicon components can be aggregated using multi-chip technologies. In such a case, the electrical, mechanical and thermal attributes of these silicon devices can have greater similarities, and offer the opportunity for deeper integration than discreet power supplies, processors, rack switches, and spinning disk media.

Turning to FIG. 3, the system 300 shown therein illustrates two exemplary mechanisms by which self-powered processing devices can be aggregated, such as into rack-like structures, to enable large-scale self-powered computing. Multiple self-powered processing devices can be aggregated into a cluster of power generation, computation and solid-state storage to create a large-scale high performance or "web-scale" computing device. For example, and as described above with reference to FIG. 2, the processing device 120 of a self-powered processing device, such as the exemplary self-powered processing device 101, can comprise both silicon processing circuitry and solid-state storage. The associated power generator 110, such as of the exemplary self-powered processing device 101, can, as indicated, provide power generation capabilities. As such, the aggregation of multiple ones of the self-powered processing devices into clusters, such as those of the system 300 of FIG. 3, can result in an aggregation of the power generation, computation and storage capabilities of each individual self-powered processing device. And, as will be recognized by those skilled in the art, the aggregation of such capabilities can be more functionally useful than merely the sum of their independent parts. Additionally, and as will be described further below, the physical size and connectivity associated with combining solid-state power generation, solid-state computation and solid-state storage can enable a multitude of new, dense and innovative packaging techniques to be used to build large-scale computer systems. The complete silicon integration of energy generation, computation, network and storage can enable improvements in reliability, service costs and other like beneficial metrics.

More specifically, and with reference to FIG. 3, the self-powered processing device 101, illustrated in detail in FIG. 1, and described in detail above, is shown in the system 300, together with other analogous self-powered processing devices in the form of the self-powered processing devices 341, 342 and 343. For purposes of illustration, each of the exemplary self-powered processing devices 101, 341, 342 and 343 are shown with physical communicational connections, such as the physical communicational connection 139 of the self-powered processing device 101. As indicated previously, a self-powered processing device can comprise a communicational connection, such as the communicational connection 139 that was illustrated in FIG. 1. In one embodiment, such a communicational connection can be a physical communicational connection, such as the exemplary physical communicational connection 339 that is shown in FIG. 3. A physical communicational connection can be comprised of one or more wires, leads, traces, etches, lines or other like physical electrical conduits that can conduct communicational signals, in the form of electrical energy, from appropriate portions of the processing device 120, such as the network interface 270 described above, and shown in FIG. 2, to the periphery of the processing device 120. Once at the periphery of the processing device 120, the physical communication connection 339 can be oriented in such a manner that it can mate with an appropriate plug, slot, socket, or other like physical electrical interface of a device that is separable from the self-powered processing device 101. For example, as illustrated by the dashed lines 338 that are shown in FIG. 3, the physical communicational connection 339 can physically mate with the slot 312 of a structure, such as the backplane 310, thereby communicationally coupling the processing device 120 to the backplane 310.

In one embodiment, the backplane 310 can comprise multiple slots equivalent to the slot 312 to which the self-powered processing device 101 can be communicationally coupled. For example, the backplane 310 can comprise a slot 311 to which another self-powered processing device, such as the self-powered processing device 341, can be communicationally coupled. In such a manner, in one embodiment, the backplane 310 can support multiple self-powered processing devices including, as indicated, the self-powered processing devices 101 and 341, as well as additional self-powered processing devices 315 that are shown in the system 300 of FIG. 3 as being already communicationally coupled to the backplane 310. The backplane 310 can then further comprise a high-bandwidth wired network connection 320, thereby enabling each of the self-powered processing devices to communicate, via their respective physical communicational connections and the corresponding slots of the backplane 310, with the network 290.

The backplane 310 can be further configured to enable the provision of fuel to the self-powered processing devices that are communicationally coupled thereto. For example, in one embodiment, the self-powered processing devices that are communicationally coupled to the backplane 310 can comprise power generators analogous to the exemplary fuel cell of the self-powered processing device 150 that was illustrated in FIG. 1 and described in detail above. More specifically, in such an embodiment, the self-powered processing devices that are communicationally coupled to the backplane 310 can receive their fuel from a single direction. Thus, for example, as illustrated in the system 300 of FIG. 3, fuel, including multiple different types of fuel, such as the above-described hydrogen gas and oxidants, can be provided from the back of the self-powered processing devices that are communicationally coupled to the backplane 310, such as the illustrated self-powered processing devices 315, and can flow through such self-powered processing devices in a back-to-front direction, as shown by the arrows 331 and 332. In one embodiment, the arrows 331 and 332 can represent different types of fuel. For example, the arrow 331 can represent the above-described hydrogen gas fuel, while the arrow 332 can represent the above-described oxidant fuel.

In another embodiment, illustrated by the backplane 350, shown in the system 300 of FIG. 3, self-powered processing devices, such as the exemplary self-powered processing devices 342 and 343, can be vertically oriented with respect to one another. More specifically, the self-powered processing devices 342 and 343 can be communicationally coupled to the backplane 350 via slots 351 and 352, respectively, in the manner shown in the system 300 of FIG. 3, thereby resulting in a configuration in which the self-powered processing devices 342 and 343 are "stacked" vertically. Other self-powered processing devices can, likewise, be physically and communicationally coupled to the backplane 350, as illustrated by the multiple self-powered processing devices 355, which are also vertically oriented with respect to one another.

The backplane 350 can, like the backplane 310, comprise a high-bandwidth wired connection 320 to the network 290. In such a manner, the self-powered processing devices that are physically and communicationally coupled to the backplane 350, in a vertically oriented arrangement, can, each, be communicationally coupled to the network 290 via the high-bandwidth wired network connection 320 and via their own, individual, communicational connections to the backplane 350, such as via the slots 351 and 352, and the corresponding communication connections of the self-powered processing devices that are connected thereto.

In one embodiment, by orienting the self-powered processing devices in a vertical arrangement, fuel can be provided to the self-powered processing devices from orthogonal directions. For example, as illustrated by the arrows 361 and 362, one type of fuel, such as, for example, the hydrogen gas described above, can be provided from the left side in a left-to-right manner across the self-powered processing devices 355, as illustrated by the arrow 361 in FIG. 3, while another, different type of fuel, such as, for example, the oxidant that was also described above, can be provided from the back in a back-to-front manner across the self-powered processing devices 355, as illustrated by the arrow 362 in FIG. 3. In such a manner, a separation can be maintained between different types of fuels by providing those fuels to the self-powered processing devices from orthogonally facing directions.

In other embodiments, rather than relying on a physical communicational connection, such as the physical communicational connection 339 shown in FIG. 3, the self-powered processing devices, such as the self-powered processing devices shown in FIG. 3 can communicate with one another, and with other computing devices, such as over the network 290, via wireless communications. In such embodiments, while structures for physically supporting the self-powered processing devices can still be utilized to define structures of multiple self-powered processing devices, such as the exemplary structures shown in FIG. 3, such structures need not comprise physical communicational slots. Instead, as one example, one or more of the self-powered processing devices can comprise wireless communicational capability for wireless communicating with other self-powered processing devices or with a centralized base station. Such a centralized base station can be provided as part of the structures providing the physical support for the self-powered processing devices and can take the place of the physical communicational connections illustrated as part of the backplanes 310 and 350 that are shown in FIG. 3. In one embodiment, such a wireless communicational connection can rely on high-frequency wireless communications, which, as will be recognized by those skilled in the art, can provide for high throughput wireless communications even in noisy environments.

Figure 4:
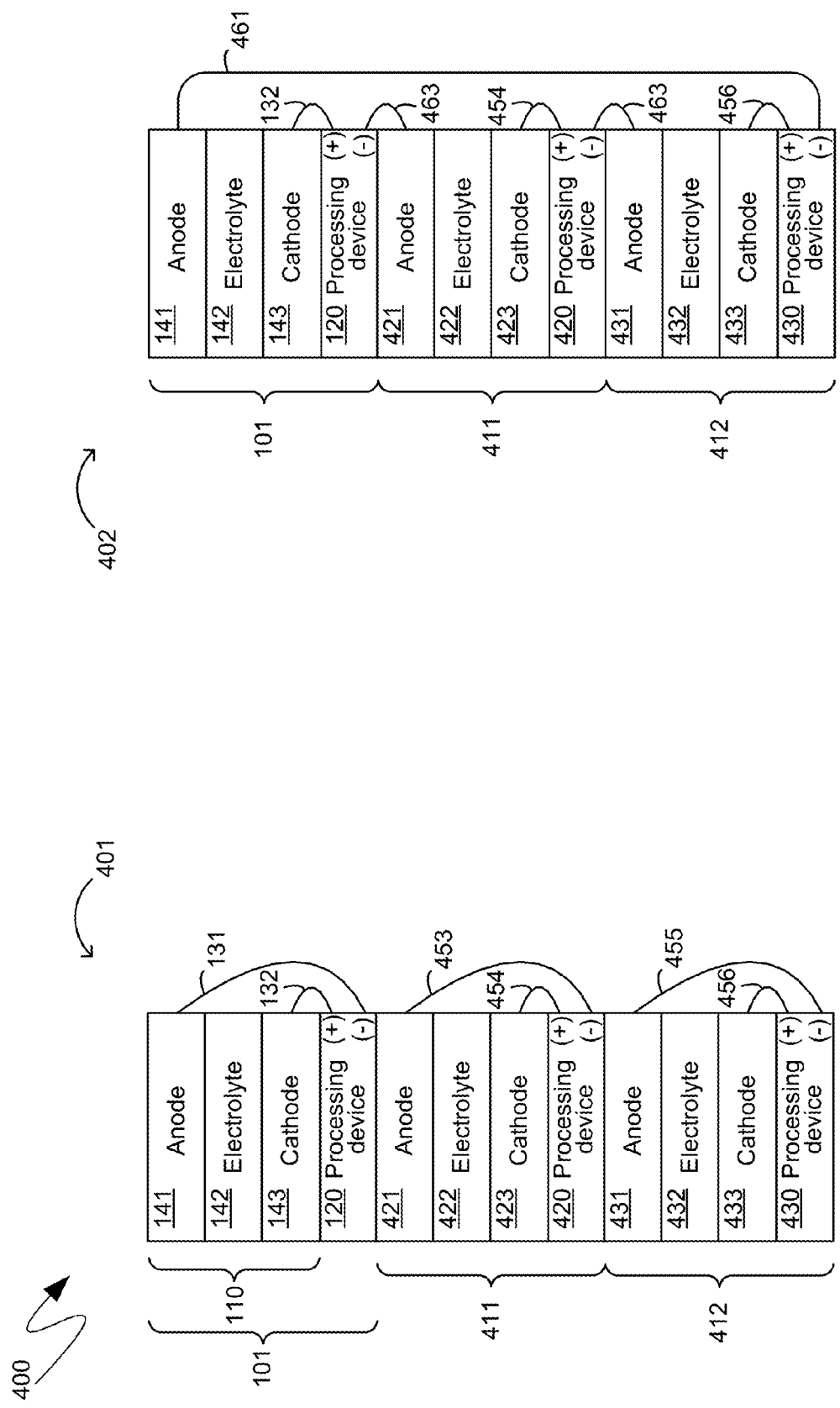
FIG. 4 is a block diagram of another exemplary arrangement of unitary self-powered processing devices.

While the above described self-powered processing devices can be utilized as individual, standalone units, the structures of FIG. 3 illustrate that they can also be aggregated in an efficient manner to provide large-scale computational processing capabilities without requiring power infrastructure, other than the delivery of whatever fuel was required by the self-powered processing devices. Turning to FIG. 4, the aggregation of such multiple self-powered processing devices can, in one embodiment, be arranged to provide electrical power transmission efficiencies. More specifically, the system 400 of FIG. 4 illustrates two separate electrical power transmission structures, in the form of the electrical power transmission structures 401 and 402, illustrating two different power transmission embodiments.

Turning first to the electrical transmission structure 401, the electrical transmission structure 401 illustrates an infrastructure for providing electrical power from the power generator component of a self-powered processing device to the processing device component thereof that can be implemented to maintain independence of each self-powered processing device. In particular, and as illustrated by FIG. 4, each self-powered processing device in the electrical transmission structure 401 can be configured to receive power only from its own power generation component. For example, the electrical transmission structure 401 can comprise the self-powered processing device 101 that was originally illustrated in FIG. 1, and described in detail above. Such a self-powered processing device 101 can comprise a power generator 110 and a processing device 120 that can receive electrical power only from the power generator 110 that is part of the same self-powered processing device 101 as the processing device 120. Thus, as shown, the electrodes 131 and 132 can provide electrical power from the power generator 110, of the self-powered processing device 101, to the processing device 120 that is also part of the self-powered processing device 101. As an example, returning to the above described embodiment, where the power generation component 110 can be a fuel-cell, the power generation component 110 can comprise an anode 141, an electrolyte 142 and a cathode 143, and the electrodes 131 and 132 can proceed from the anode 141 and the cathode 143, respectively, to the processing device 120, thereby providing the processing device 120 with the electrical power that is generated by the power generator 110.

By way of further illustration, structure 401 comprises other self-powered processing devices, exemplarily arranged in a vertical orientation, such as, the self-powered processing devices 411 and 412. The self-powered processing device 411 can comprise a processing device 420, analogous to the processing device 120 of the self-powered processing device 101. In addition, the self-powered processing device 411 can comprise an anode 421, an electrolyte 422 and a cathode 423, and can further comprise electrodes 453 and 454 from the anode 421 and the cathode 423, respectively, to the processing device 420. In such a manner, the processing device 420 of the self-powered processing device 411 can receive electrical power from other components of that same self-powered processing device 411. Similarly, the self-powered processing device 412 can comprise a processing device 430, an anode 431, an electrolyte 432, a cathode 433, and electrodes 455 and 456 from the anode 431 and the cathode 433, respectively, to the processing device 430. Thus, the processing device 430 of the self-powered processing device 412 can also receive electrical power from other components of that same self-powered processing device 412.

As can be seen from the illustration of the structure 401 in FIG. 4, however, the electrodes 131, 453 and 455 do not extend to the closest anodes to the processing devices to which the electrodes 131, 453 and 455 are connected. More specifically, as one example, the electrode 131 extends from the anode 141 to the processing device 120, while, in the vertically stacked arrangement exemplified by the structure 401, the closest anode to the processing device 120 is not the anode 141, but rather is the anode 421 of the self-powered processing device 411. Thus, in one embodiment, where self-powered processing devices are arranged proximate to one another, it can be advantageous for the processing device components of those self-powered processing devices to receive electrical power from multiple ones of the power generation components of those self-powered processing devices.

For example, and with reference to the electrical transmission structure 402, the processing device 120 of the self-powered processing device 101 can receive electrical power from the cathode 143 of that same self-powered processing device 101, as well as from the anode 421 of a different self-powered processing device, namely the self-powered processing device 411. In such an arrangement, the electrode 132 can remain as in the electrical transmission structure 401, but the electrode 131, shown in the structure 401, which extends from the anode 141 to the processing device 120 can, instead, be replaced by a shorter electrode 463 in the structure 402, which can extend from the anode 421 to the processing device 120. In a similar manner, the processing device 420 can receive electrical power from the cathode 423, as before, via the electrode 454, but rather than receiving electrical power from the anode 421, such as via the electrode 453, the processing device 420, in the structure 402, can, instead, receive power from the anode 431, which is part of a self-powered processing device 412 that is different than the self-powered processing device 411 comprising the processing device 420. Thus, instead of the electrode 453 that was illustrated as part of the structure 401, the structure 402 can comprise an electrode 463 extending from the anode 431 of the self-powered processing device 412 to the processing device 420 of the different self-powered processing device 411. As can be seen from FIG. 4, the electrode 463 can be shorter than the electrode 453. In such a manner, in the exemplary electrical transmission structure 402, the processing device components of self-powered processing devices can receive electrical power, not only from the power generation components of those same self-powered processing devices, but also from the power generation components of proximally located self-powered processing devices. As will be recognized by those skilled in the art, the exemplary electrical transmission structure 402 can operate most effectively if the power generation components of the self-powered processing devices in such an arrangement each generate an electrical potential that is approximately equal. Additionally, as illustrated by the electrode 461, in such an exemplary electrical transmission structure 402, at least one electrode, such as the electrode 461, can proceed across multiple ones of the self-powered processing units, connecting, for example, the anode 141, of the self-powered processing device 101, to the processing device 430, of the self-powered processing device 412.

Figure 5:
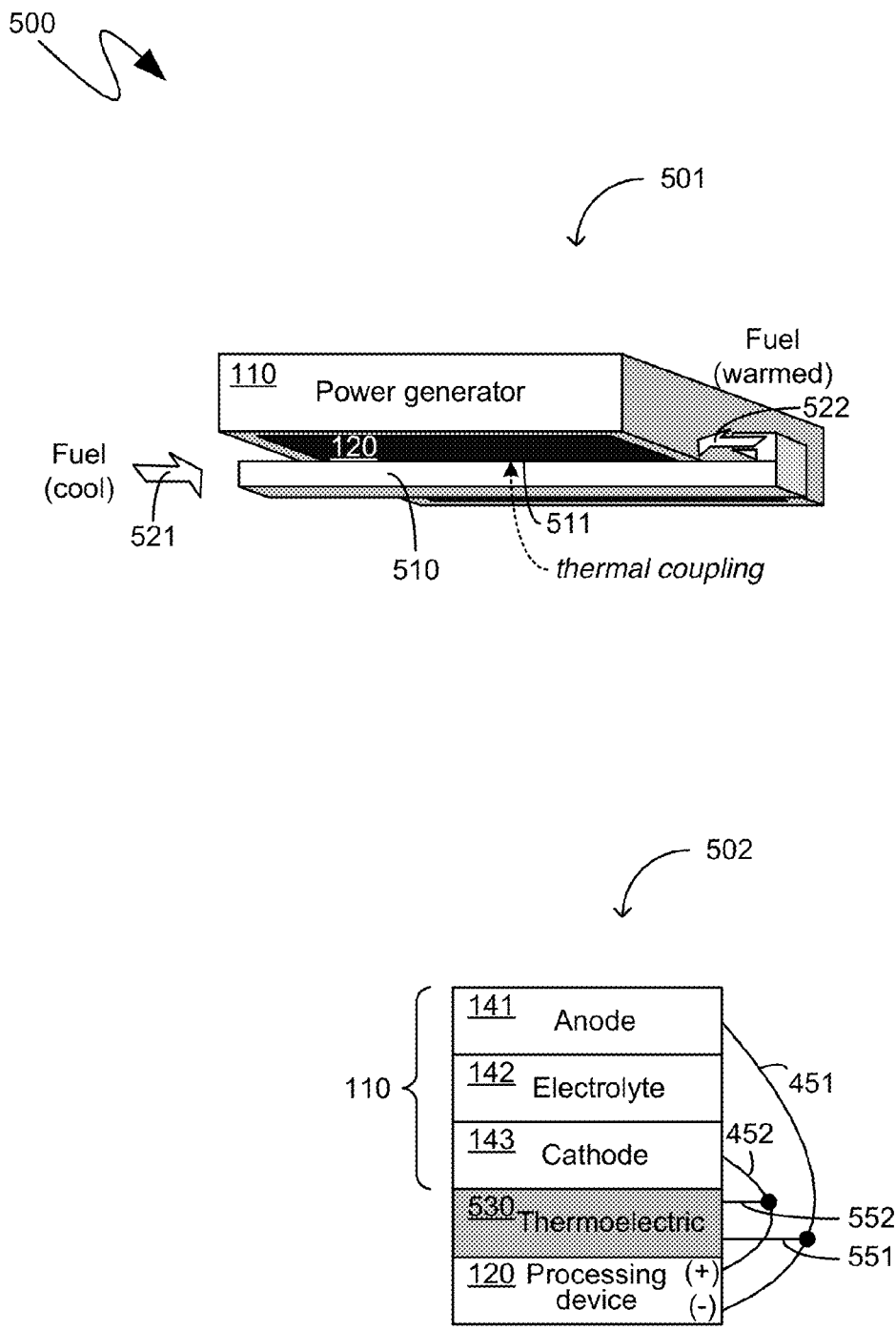
FIG. 5 is a block diagram of exemplary thermal management aspects of an exemplary unitary self-powered processing device.

Turning to FIG. 5, the system 500 shown therein illustrates thermal transfer aspects of the self-powered processing devices described above. As indicated previously, self-powered processing devices can represent a physical, electrical, and thermal coupling of a power generation component and a processing component such that the two components form a single, unitary self-powered processing device structure. Consequently, thermal aspects of the power generation component and the processing component can operate in a symbiotic manner. In one embodiment, for example, as illustrated by the structure 501, the self-powered processing device can be oriented such that fuel delivery hardware, such as the piping 510, which can deliver fuel to the power generator 110 of the self-powered processing device, can act to cool the corresponding processing device 120 of that self-powered processing device. More specifically, and as will be recognized by those skilled in the art, the fuel provided to power generators, such as fuel cells, is often stored, transported, and provided at temperatures below the temperatures typically reached by processing units, especially when such processing units are actively performing computational processing. Consequently, if a thermal coupling is established, such as the exemplary thermal coupling 511 shown in FIG. 5, between a processing unit, such as the exemplary processing device 120, and a structure that maintains a thermal connection to such fuel, such as, for example, the piping 510 through which such fuel travels, then the cooler temperatures of the fuel can be utilized to cool the processing device 120 by absorbing some of the heat from the processing device 120, and, in turn, increasing the temperature of the fuel. Thus, as illustrated in the system 500 of FIG. 5, fuel 521, at a lower temperature, can be initially provided to the piping 510, and, after passing along the piping 510, which has the thermal coupling 511 with the processing device 120, the fuel 522, at a higher temperature, can be provided to the power generator 110.

As will be recognized by those skilled in the art, processing units, such as exemplary processing device 120, can require cooling in order to perform optimally, because such processing units typically have a maximum operating temperature beyond which optimal performance can no longer be achieved. Moreover, as will also be recognized by those skilled in the art, power generators, such as fuel cells, can typically benefit from warmer fuel, since fuel cells can operate at a greater efficiency at higher temperatures. Consequently, the structure 501 illustrated in FIG. 5 can cool the processing device 120 while simultaneously warming the fuel for the power generator 110, thereby achieving symbiotic thermal transfer benefits.

In an alternative embodiment, a self-powered processing device can comprise a thermoelectric component 530 in addition to the power generator 110 and the processing device 120 that were described previously. More specifically, and as illustrated by the exemplary self-powered processing device 502 of the system 500 of FIG. 5, a thermoelectric component 530 can be constructed between the processing device 120 and the power generator 110. As indicated previously, it can be beneficial for the processing device 120 to be cooled and it can also be beneficial for certain types of power generators such as, for example, a fuel cell comprising the anode 141, the electrolyte 142 and the cathode143, to operate at higher temperatures. Thus, in one embodiment, the thermoelectric component 530 can be electrically coupled to the power generator 110 and the processing device 120, such as, for example, via the electrodes 551 and 552, which can be electrically connected to the electrodes 451 and 452 that can provide electrical power from the power generator 110 to the processing device 120. In such an embodiment, the thermoelectric component 530 can consume electrical power in order to actively transfer heat from the processing device 120 to the power generator 110, thereby actively cooling the processing device 120 and, simultaneously, actively heating the power generator 110.

In another embodiment, rather than consuming electrical power in order to generate or increase a temperature differential between the processing device 120 and the power generator 110, the thermoelectric 530 can generate electrical power due to an otherwise created temperature differential between the processing device 120 and the power generator 110. For example, as will be recognized by those skilled in the art, fuel cells can increase in temperature as they generate electrical power. Similarly, the processing device 120 can be cooled, either through active or passive means, such as, for example, through heat-sinks, thermal couplings with cooler devices such as, for example, the thermal coupling 511 described in detail above, or other like means. Consequently, through normal operation, the power generator 110, in the form of fuel cell, can increase in temperature, while the processing device 120 can be cooled. Such a temperature differential can cause a thermoelectric compound, such as the exemplary thermoelectric component 530, to generate electrical power in a manner well known to those skilled in the art. In such an embodiment, the electrodes 551 and 552 can supplement the power being delivered to the processing device 120 via the electrodes 451 and 452, respectively, thereby increasing the overall efficiency of the exemplary self-powered processing device 502.

Figure 6:
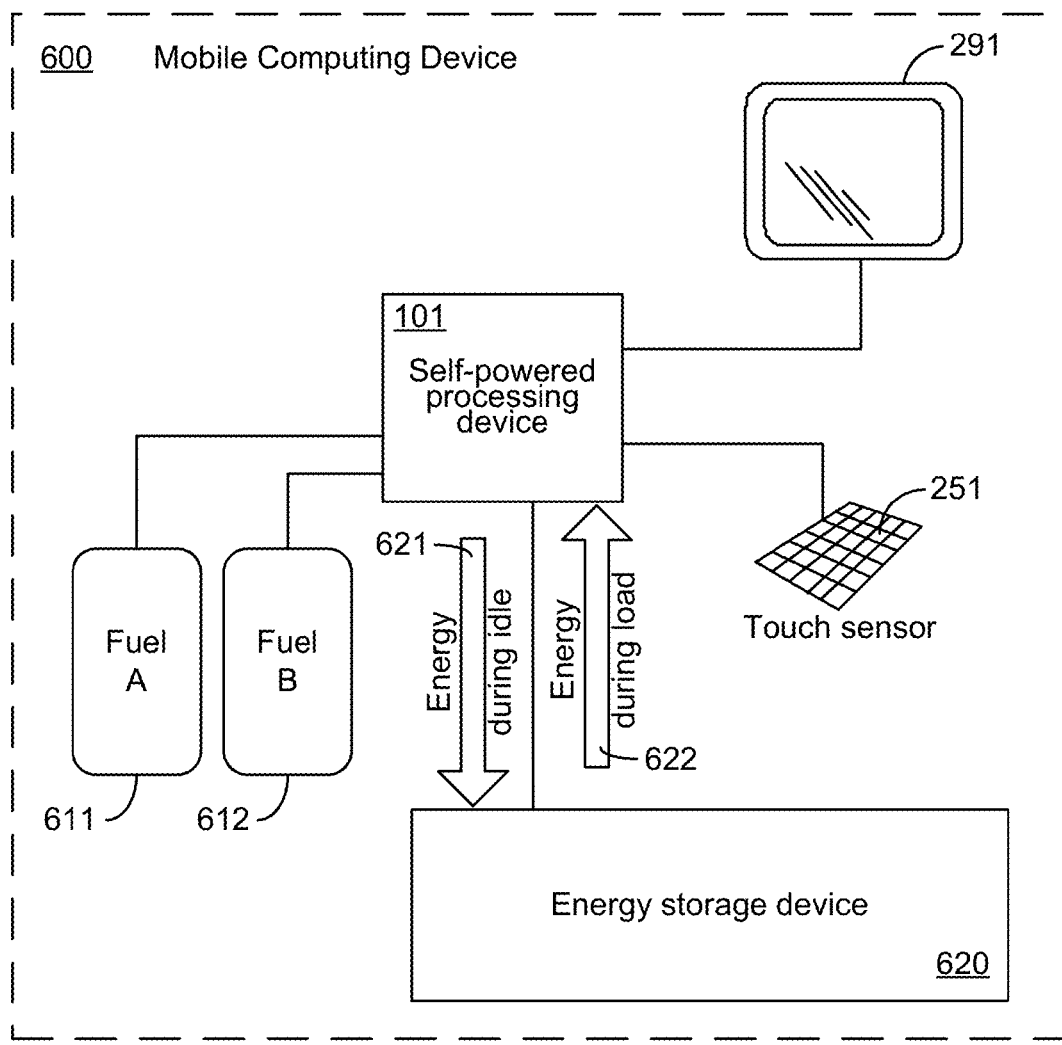
FIG. 6 is a block diagram of an exemplary mobile computing device comprising an exemplary unitary self-powered processing device.

Turning to FIG. 6, the mobile computing device 600 shown therein, illustrates another exemplary utilization of a self-powered processing device, such as the exemplary self-powered processing device 101 described in detail above. More particularly, in one embodiment, the mobile computing device 600 can comprise the self-powered processing device 101 whose components were illustrated in detail in FIG. 2, and which can include, for example, SOC processing capability. Consequently, the mobile computing device 600 can also comprise the display device 291, which can be communicationally coupled to the self-powered processing device 101, and the touch sensor 251, or other user input mechanism, which can also be communicationally coupled to the self-powered processing device 101. The exemplary mobile computing device 600 can further comprise fuel storage and delivery mechanisms, such as the exemplary fuel canisters 611 and 612, which can provide fuel to the self-powered processing device 101. The fuel canisters 611 and 612 can comprise, for example, hydrogen gas, oxides, or other like fuel, which can be pressurized for more convenient storage and delivery. Additionally, the fuel canisters 611 and 612 can be physically sized in accordance with the dimensions of the mobile computing device 600 and the fuel requirements of the exemplary self-powered processing device 101.

In one embodiment, the mobile computing device 600 can take advantage of the self-powered capabilities of the self-powered processing device 101, and need not comprise any power delivery, storage, transformation, or other like power-centric components, mechanisms or elements. In such an embodiment, the mobile computing device 600 can provide users with mobile computing functionality utilizing only the fuel consumed by the self-powered processing device 101, such as, for example, the fuel in the fuel canisters 611 and 612. Such a mobile computing device can be particularly useful in environments where traditional battery-powered mobile computing devices would be impractical such as, for example, environments where access to electrical energy for purposes of recharging such batteries can be impractical or unavailable.

In another embodiment, the mobile computing device 600 can further comprise an energy storage device 620, such as, for example, the ubiquitous battery. In such another embodiment, there can be an exchange of electrical energy between the self-powered processing device 101 and the energy storage device 620, such as is illustrated by the arrows 621 and 622, which are shown in FIG. 6. More particularly, and is will be recognized by those skilled in the art, certain types of power generators, such as the above described fuel cells, can have a limited capability for transitioning between generating differing amounts of electrical power. For example, a fuel cell can have difficulty in instantaneously transitioning between generating a small amount of electrical energy and a large amount of electrical energy, and can, instead, experience a ramp-up period of increasing electrical energy generation. By contrast, and as will also be recognized by those skilled in the art, processing devices can almost instantaneously transition between performing large amounts of computational processing and merely idling, or performing small amounts of computational processing. Consequently, because the power required by a processing unit can be dependent upon the quantity of computational processing it is performing, there can exist situations where the power generation component of the self-powered processing device 101 is generating more electrical power than the processing device component thereof is consuming and there can, also, exist situations where the processing device component of the self-powered processing device 101 requires a greater amount of electrical power than the power generating component thereof can instantaneously generate. In such situations, the energy storage device 620 can act as an electrical power shock absorber to source electrical energy when needed, and consume electrical energy for storage when an excess amount of electrical energy is being generated.

For example, if the processing device component of the self-powered processing device 101 is quickly transitioned from performing a large amount of computational processing to performing a small amount of computational processing, or merely idling, the power generation component of the self-powered processing device 101 may end up generating an excess amount of energy until it more slowly decreases its electrical power output. In such an instance, energy generated by the self-powered processing device 101, which is not being consumed thereby, can be provided to the energy storage device 620, as illustrated by the arrow 621. The energy storage device 620, such as a battery, can be recharged with such energy. Conversely, as another example, if the processing device component of the self-powered processing device 101 is quickly transitioned from an idle state to a state in which it is requested to perform a large amount of computational processing, the processing device component of the self-powered processing device 101 may require a greater amount of electrical energy than can instantaneously be sourced by the power generation component thereof. In such an instance, the energy utilized by the self-powered processing device 101 can, temporarily, be sourced, at least in part, from the energy storage device 620, such as until the power generation component of the self-powered processing device 101 can increase its electrical power output.

In another embodiment, the self-powered processing device 101 can be cognizant of the limitations of the power generation components thereof and can coordinate its processing functionality in accordance with the power generation capabilities of the power generation component the self-powered processing device 101. For example, the self-powered processing device 101 can slowly ramp up its computational processing, such as, for example, by declining to perform certain tasks until the power generation component of the self-powered processing device 101 is able to increase its electrical power output. As another example, the self-powered processing device 101 can slowly ramp down its computational processing, such as, for example, by performing low priority tasks, or processing "busy work", until the power generation component of the self-powered processing device 101 can decrease its electrical power generation output. Alternatively, or in addition, such processing load control can be performed in conjunction with the energy storage device 620 such that, under certain conditions, the power generation limitations of the self-powered processing device 101 are accommodated by controlling the amount of processing being performed by it, while, under other conditions, the power generation limitations of the self-powered processing device 101 are accommodated either by the provision of excess electrical energy to the energy storage device 620 or by the consumption of electrical energy therefrom.

The above descriptions, regarding the sharing of energy between the self-powered processing device 101 and the energy storage device 620 are equally applicable to other embodiments beyond those illustrated by FIG. 6. For example, in one embodiment, rather than providing energy to, and receiving energy from, an energy storage device, one or more self-powered processing devices can provide energy to, and receive energy from the ubiquitous electrical power grid. More specifically, in such an embodiment, during periods when the power generator of the self-powered processing device 101 is generating a greater amount of power than the processing device is utilizing, such as those described in detail above, such excess power can be returned back to the electrical power grid. Typically, such a provision of power to the electrical power grid can result in a credit. Conversely, in such an embodiment, during periods when the processing device of the self-powered processing device 11 is utilizing a great amount of power than the power generator to produce, such additional power can be consumed from the electrical power grid. Because, in such an embodiment, the self-powered processing device 101 can be connected to the power grid, such an embodiment can be more applicable to the multi-self-powered processing device systems, such as those described above with reference to FIG. 3. As another example, in another embodiment, excess power generated by a self-powered processing device can be provided to other components of a computing device. In such an embodiment, such excess components maybe components designed to operate during transient periods of power, and can perform opportunistic functions, such as a periodic operation of a Global Positioning System (GPS) functionality to enable the mobile computing device 600 to the location aware, during at least discrete portions of time.

As can be seen from the above descriptions, a self-powered processing device has been enumerated. In view of the many possible variations of the subject matter described herein, we claim as our invention all such embodiments as may come within the scope of the following claims and equivalents thereto.

We claim:

1. A self-powered processing device comprising:
   a power generator configured to generate electrical power in a form and potential that is natively consumable by a processing circuitry;
   a processing device comprising the processing circuitry;
   a silicon-based material comprising at least some of the processing circuitry and structures of the power generator;
   at least one electrical connection between the power generator and the processing device, the at least one electrical connection enabling the processing device to consume the electrical power generated by the power generator; and
   an external electrical connection, wherein the self-powered processing device provides excess electrical energy via the external electrical connection during periods when processing performed by the processing device decreases more rapidly than a corresponding decrease in power generated by the power generator, and wherein further the self-powered processing device consumes excess electrical energy via the external electrical connection during periods when processing performed by the processing device increases more rapidly than a corresponding increase in power generated by the power generator.

2. The self-powered processing device of claim 1, wherein the processing device further comprises computer-readable storage media.

3. The self-powered processing device of claim 1, comprising a second thermal coupling between the processing device and fuel being routed to the power generator, the second thermal coupling enabling the fuel to cool the processing device and further enabling the processing device to heat up the fuel prior to its consumption by the power generator.

4. The self-powered processing device of claim 1, wherein the processing device executes computer-executable instructions for delaying an increase in processing performed by the processing device to allow time for the power generator to correspondingly increase the electrical power it generates.

5. The self-powered processing device of claim 1, wherein the processing device executes computer-executable instructions for performing low priority tasks, thereby delaying a decrease in processing performed by the processing device to allow time for the power generator to correspondingly decrease the electrical power it generates.

6. The self-powered processing device of claim 1, wherein the processing circuitry is etched on a first side of the silicon-based material and the structures of the power generator are etched on a second side of the silicon-based material, wherein the second side is opposite the first side.

7. A computing device comprising:
a self-powered processing device comprising a power generator integrated with a processing device and an external electrical connection, wherein the self-powered processing device provides excess electrical energy via the external electrical connection during periods when processing performed by the processing device decreases more rapidly than a corresponding decrease in power generated by the power generator, and wherein further the self-powered processing device consumes excess electrical energy via the external electrical connection during periods when processing performed by the processing device increases more rapidly than a corresponding increase in power generated by the power generator; and
an electrical energy storage device;
wherein the processing device executes computer-executable instructions that delay an increase in processing performed by the processing device to allow time for the power generator to correspondingly increase electrical power generated by it; and
wherein further the processing device executes computer-executable instructions comprising low priority tasks to delay a decrease in processing performed by the processing device to allow time for the power generator to correspondingly decrease the electrical power generated by it.

8. The computing device of claim 7, further comprising fuel canisters comprising pressurized gas; wherein the power generator is a fuel cell.

9. The computing device of claim 7, further comprising piping from the fuel canisters to the power generator, the piping forming a thermal coupling with the processing device, the thermal coupling transferring heat from the processing device to the fuel being carried to the power generator by the piping.

10. The computing device of claim 7, wherein the self-powered processing device further comprises a thermoelectric between the power generator and the processing device, the thermoelectric either generating additional electrical energy based upon a temperature differential between the power generator and the processing device, or consuming some electrical energy generated by the power generator to actively transfer heat from the processing device to the power generator.

11. The computing device of claim 7, wherein the electrical energy storage device is electrically coupled to the self-powered processing device via the external electrical connection and stores excess electrical energy generated by the self-powered processing device during periods when processing performed by the processing device decreases more rapidly than a corresponding decrease in power generated by the power generator.

12. The computing device of claim 7, wherein further the electrical energy storage device is electrically coupled to the self-powered processing device via the external electrical connection and provides extra electrical energy to the self-powered processing device during periods when processing performed by the processing device increases more rapidly than a corresponding increase in power generated by the power generator.

13. A system comprising:
a first self-powered processing device comprising a first power generator, a first processing device, a first external electrical connection and a first physical coupling between the first power generator and the first processing device causing the first power generator and the first processing device to form a first single unitary structure, wherein the first self-powered processing device provides excess electrical energy via the first external electrical connection during periods when processing performed by the first processing device decreases more rapidly than a corresponding decrease in power generated by the first power generator, and wherein further the first self-powered processing device consumes excess electrical energy via the external electrical connection during periods when processing performed by the first processing device increases more rapidly than a corresponding increase in power generated by the first power generator;
a second self-powered processing device comprising a second power generator, a second processing device, a second external electrical connection and a second physical coupling between the second power generator and the second processing device causing the second power generator and the second processing device to form a second single unitary structure; and
a communicational connection between the first self-powered processing device, the second self-powered processing device and a network of further computing devices;
wherein the first self-powered processing device and the second self-powered processing device are joined either by a inter-device physical coupling or by an inter-device electrical power coupling.

14. The system of claim 13, wherein the first power generator comprises a first fuel cell comprising a first anode and a first cathode; and wherein further the inter-device physical coupling creates channels for forcing a fuel gas across at least one of the first anode, or the first cathode, the channels being created by a physical coupling between either the first anode, or the first cathode and the second processing device.

15. The system of claim 13, wherein the first power generator comprises a first fuel cell comprising a first anode and a first cathode and the second power generator comprises a second fuel cell comprising a second anode and a second cathode; and wherein further the inter-device electrical power coupling comprises an electrical power coupling between at least one of the first anode or the first cathode and the second processing device, the second processing device also comprising an electrical power coupling to at least one of the second cathode or the second anode, respectively.

16. The system of claim 13, wherein the first processing device comprises a first wired communicational connector and the second processing device comprises a second wired communicational connector; the system further comprising:
a backplane comprising a first slot for accepting the first wired communicational connector and a second slot for accepting the second wired communicational connector, the backplane supporting the first self-powered processing device and the second self-powered processing device in either a vertical or a horizontal orientation with respect to one another; and
fuel delivery mechanisms for delivering a first fuel to a first side of both the first self-powered processing device and the second self-powered processing device and for delivering a second, different fuel to a second side of both the first self-powered processing device and the second self-powered processing device, the second side being different from and adjacent to the first side if the backplane supports the first and second self-powered processing devices in the vertical orientation, the second side being the same as the first side if the backplane supports the first and second self-powered processing devices in the horizontal orientation.

17. The system of claim 13, wherein the first self-powered processing device further comprises a thermoelectric between the first power generator and the first processing device, the thermoelectric either generating additional electrical energy based upon a temperature differential between the first power generator and the first processing device, or consuming some electrical energy generated by either the first or the second power generator to actively transfer heat from the first processing device to the first power generator.

18. The system of claim 13, wherein the first self-powered processing device further comprises a thermal coupling between the first processing device and fuel being routed to the first power generator, the thermal coupling enabling the fuel to cool the first processing device and further enabling the first processing device to heat up the fuel prior to its consumption by the first power generator.

19. The system of claim 13, wherein the first processing device executes computer-executable instructions for delaying an increase in processing performed by the first processing device to allow time for the first power generator to correspondingly increase the electrical power it generates.

20. The system of claim 13, wherein the first processing device executes computer-executable instructions for performing low priority tasks, thereby delaying a decrease in processing performed by the processing device to allow time for the power generator to correspondingly decrease the electrical power it generates.

\* \* \* \* \*